| United States Patent [19] | [11] | 4,312,800 |
|---|---|---|
| Jasenof et al. | [45] | Jan. 26, 1982 |

[54] ANODIC ELECTROCOATING OF ALUMINUM TO OBTAIN IMPROVED CORROSION RESISTANCE

[75] Inventors: Kenneth E. Jasenof, Skokie; James W. Wichmann, Blue Island, both of Ill.

[73] Assignee: DeSoto, Inc., Des Plaines, Ill.

[21] Appl. No.: 924,568

[22] Filed: Jul. 14, 1978

[51] Int. Cl.³ .................................................. C08K 3/10
[52] U.S. Cl. ............................ 260/29.6 E; 204/181 R; 260/29.6 H
[58] Field of Search ...................... 260/29.6 H, 29.6 E

[56] References Cited

U.S. PATENT DOCUMENTS

| 2,954,358 | 9/1960 | Hurwitz | 260/42.28 |
| 3,862,075 | 1/1975 | Sekmakas | 260/29.6 N |
| 3,953,391 | 4/1976 | Dowbenko | 260/29.6 H |
| 4,065,415 | 12/1977 | Christenson | 260/29.6 E |

*Primary Examiner*—Paul R. Michl
*Attorney, Agent, or Firm*—Dressler, Goldsmith, Shore, Sutker & Milnamow, Ltd.

[57] ABSTRACT

There is disclosed an aqueous anodic electrodeposition bath adapted to electrodeposit substantially clear coatings possessing superior corrosion resistance on aluminum substrates in which water has dispersed therein a carboxy-functional polymer at least partially neutralized with a volatile base together with from 0.08 to 0.5 part, per 1000 parts of the bath, of finely divided particles of pigment grade. The carboxyl-functional polymer preferably comprises a copolymer formed by polymerization in aqueous dispersion of the monomers in solution in an appropriate polyhydric alcohol. The pigment is preferably suspended in a carboxyl-functional resin which dissolves in water with the aid of a base. The preferred soluble resin is a copolymer with an oleyl alcohol ether of a polyepoxide and the preferred pigment is barium chromate.

9 Claims, No Drawings

ANODIC ELECTROCOATING OF ALUMINUM TO OBTAIN IMPROVED CORROSION RESISTANCE

DESCRIPTION

This invention relates to the anodic electrocoating of aluminum substrates in order to improve the corrosion resistance of the coated aluminum.

TECHNICAL FIELD

In the conventional anodic electrocoating of aluminum, the aluminum is given a chromate pretreatment in order to improve the corrosion resistance, but this pretreatment is costly, it introduces pollution problems, and it hampers the electrocoating process. The objective of this invention is to modify the anodic electrocoating bath so as to obtain improved corrosion resistance even when the chromate pretreatment is not employed.

In anodic electrocoating, a carboxyl-functional solvent-soluble resin is dispersed in water with the aid of a volatile base and electrophoretically deposited using a unidirectional electrical current upon the anode which, herein, is an aluminum substrate. An aminoplast resin is normally present for cure, and the electrocoated aluminum substrate is baked to cure the coating to a solvent-insoluble condition. Using a copper chlorideacetic acid salt spray solution to test the corrosion resistance of the clear coated aluminum product, it is found that the corrosion resistance is very bad unless the aluminum is appropriately pretreated.

BACKGROUND ART

In a prior application of A. J. Josefson and L. R. Munson, Ser. No. 840,033, filed Oct. 6, 1977, it is found that certain anodic electrocoating systems are superior for the coating of aluminum, but without appropriate chromate pretreatment, the clear coated aluminum, while more corrosion resistant than usual, is still badly corroded. Using a typical $Cr^{+3}$ chromate pretreatment provided by the product Alodine 401-45, the clear coated aluminum product provided in Ser. No. 840,033 is improved to a fair rating.

In contrast, and using preferred practice in this invention without chromate pretreatment, the corrosion resistance is very good. If the Alodine 401-45 chromate pretreatment of the aluminum substrate is also used, the corrosion resistance is still further improved to an excellent rating.

DISCLOSURE OF INVENTION

In this invention it is desired to retain the metallic appearance of the aluminum substrate. It is also desired to achieve corrosion protection without the expense of such extensive pigmentation as is conventionally used to achieve opacity, e.g., a pigment to binder ratio of at least about 0.1:1.0. The pigment to binder ratio used herein is typically 0.001:1.0. It has surprisingly been found that very small amounts of finely divided particles of pigment grade will significantly improve corrosion protection, especially in combination with the acrylic dispersion preferably used herein. The particles need not be known for their capacity to confer corrosion protection. Indeed, finely divided silica and titanium dioxide are satisfactory, though barium chromate is most effective in this invention. It is not the chromate moiety which is relied upon primarily, for while some other chromates are good, such as strontium chromate, some are of minimal benefit, such as calcium chromate and zinc chromate. Strontium phospho silicate is also a preferred particle in this invention, as is potassium aluminum silicate. On the other hand, barium phospho silicate is only moderate in its performance, so while the pigment grade particles in the tiny amounts specified are generally helpful, the selection of the particles which contribute superior performance is not subject to prediction.

Accordingly, and in this invention, an aqueous anodic electrodeposition bath particularly adapted to electrodeposit substantially clear coatings possessing superior corrosion resistance on aluminum substrates comprises water having dispersed therein a carboxyl-functional polymer at least partially neutralized with a volatile base, and from 0.08 to 0.5 parts, per 1000 parts of the bath, of finely divided particles of pigment grade. More pigment degrades corrosion resistance.

The acrylic dispersions which are preferably used herein are of the type disclosed in Sekmakas patent No. 3,862,075 issued Jan. 21, 1975. In these dispersions, monoethylenic monomers including from about 1 to about 30% by weight of monoethylenic carboxylic acid (preferably at least 3% of said acid), are placed in solution in a liquid mixture containing at least 0.5% by weight, based on monomers, of a low molecular weight, polyhydric alcohol having a molecular weight of from about 300 up to about 6000, and the liquid mixture so-obtained is dispersed in water and polymerized using agitation at an elevated polymerization temperature in the presence of a free radical polymerization catalyst. After polymerization has been completed, a base, preferably an amine, is added to the dispersion to at least partially neutralize the acid content of the copolymer. The copolymer particles produced in this way normally have an average diameter in the range of 0.5-5 microns, and the copolymer possesses medium molecular weight in the range of 10,000 to 50,000.

As pointed out in said Sekmakas patent, the polyhydric alcohol is preferably an aliphatic polyether having a molecular weight in the range of 350 to 5000, and is present in an amount up to about 50% of the monomers which are copolymerized. The preferred proportion of polyhydric alcohol on the same basis is from 4–25%, most preferably from 5–20%. Particularly preferred polyhydric alcohols are polyether derivatives of trihydric or tetrahydric alcohols such as glycerine, trimethylol propane, or pentaerythritol formed by adduction with ethylene oxide or propylene oxide.

When a persulfate catalyst is used in the aqueous phase to initiate the desired polymerization, as represents conventional practice, then the aqueous dispersion product is passed through a column of particulate anion exchange resin or ultrafiltration is used to remove the anions which remain from the catalyst since these anions interfere with the electrocoating operation if present in excessive amounts.

It is particularly preferred to employ copolymers of low acidity, e.g., those having an acid value as low as 3, but preferably in the range of 12 to 80. Higher acidity, up to about an acid value of 200, is permissible, but less preferred.

The monomers which may be used, the polyhydric alcohols and their proportions, and the details of the dispersion polymerization process are all more fully set forth in the commonly owned Sekmakas patent referred to previously and which is hereby incorporated by reference.

These acrylic dispersions are hard to pigment because they do not dissolve to any appreciable extent in the aqueous alkaline electrocoating bath. Best results in this invention are obtained by bringing the desired pigment particles into the bath after they have been preassociated with a carboxyl-functional resin which dissolves in water with the aid of a base. Especially good results are obtained using an epoxy ether resin which is derived from epoxy resins which are usually polyglycidyl ethers of a dihydric organic compound, the common epoxy resins which are diglycidyl ethers of bisphenols being preferred. These polyepoxides desirably have a 1,2-epoxy equivalency of from 1.2 to about 2.0 when etherified, and etherification is complete to remove residual epoxy functionality which is undesirable. The polyglycidyl ethers of bisphenols having a molecular weight of from about 350 to about 4000 are particularly preferred since these present a plurality of both ether groups and hydroxy groups. These polyepoxides are well known and available in commerce.

The term "bisphenol" denotes a pair of phenolic groups separated by an intervening divalent alkylene group. The commercial materials are derivatives of bisphenol "A".

From the standpoint of the commercially available materials, the Shell product Epon 1001 is preferred, this material having an average molecular weight of 1000, a melting point of 67°–74° C., an epoxy value of 0.20 equivalent per 100 grams. Other commercial epoxy resins of known characteristics which are also appropriate for use herein are Epon 834, Epon 864, Epon 1004, and Epon 1007.

The ethylenically unsaturated monohydric alcohol which is especially useful is oleyl alcohol. The etherification reaction is itself conventional, the reactants being cooked together at moderate temperature (75°–175° C.). An organic solvent may be present, especially to assist incorporation of an etherification catalyst, illustrated herein by boron trifluoride etherate. Inert water-miscible solvents, such as methyl ethyl ketone are preferred, since these are nonreactive with the polyepoxide and the alcohol, and they facilitate dissolution in water, which is the ultimate goal of the polymer.

While the etherification reaction is itself a conventional one, it is desired to use enough oleyl alcohol to substantially fully consume the epoxy functionality in the epoxide. This provides more than one ethylenically unsaturated terminal group so that the original polyepoxide is now subject to polymer growth at more than one location.

The unsaturated hydroxy functional polyether is then copolymerized, preferably in organic solvent solution, with monoethylenically unsaturated monomers including a proportion of carboxyl-functional monomer to produce a carboxylic acid copolymer solution. The solution copolymerization is itself conventional, the organic solvent being selected to be water miscible to ease the subsequent solubilization in water with the aid of an acid. Any water miscible organic solvent may be utilized, such as 2-butoxy ethanol, or 2-ethoxy ethanol, and the like.

The unsaturated hydroxy functional polyether should constitute from 5–75% of the copolymer, preferably from 20–60% and the balance of the copolymer should consist essentially of copolymerizable monoethylenically unsaturated monomers, a portion of which is carboxyl-functional to provide a plurality of functional groups.

Considering the balance of the copolymer which consists essentially of monoethylenic monomers, and directing attention first to the monomers which are not carboxylfunctional, these may be reactive or nonreactive, but the nonreactive monomers are preferred to constitute from about 50% up to about 85% of the monoethylenic monomers. Particularly preferred are styrene or vinyl toluene, or a mixture thereof. Monoethylenic carboxylic acid esters and diesters are also useful, such as butyl methacrylate, ethyl acrylate, dibutyl maleate, etc., but these are less preferred.

The class of monoethylenically unsaturated carboxylic acids is itself well known, acrylic acid being preferred and used as illustrative. Other useful carboxylic acids are illustrated by methacrylic acid, crotonic acid, itaconic acid, fumaric acid, monobutyl maleate, etc. The monocarboxylic acids are preferred.

These acids are use in an amount so that at least 10% of the copolymer, preferably at least 15% of the copolymer, is constituted by the residue of the carboxylic acid monomer. It is particularly preferred that the balance of the monoethylenic monomers consist essentially of styrene or vinyl toluene.

By pigment particles it is intended to define particles having an average particle size of about 0.5 microns or less.

The pigment is dispersed in the soluble carboxylfunctional polymer in an amount of 0.1 to 5 parts of pigment per part of soluble polymer, but preferably about 1 to 2 parts of pigment per part of soluble polymer. Additional water soluble carboxyl-functional polymer is preferably added to provide a ratio of acrylic dispersion resin to water soluble carboxyl-functional polymer of from 0.10:1 to 1.0:1, preferably from 0.25:1 to 0.75:1.

Illustrative pigments have been described hereinbefore, and those that provide superior performance have been noted. Barium chromate is significantly superior to the others and is preferred.

From the standpoint of electrocoating practice, this is a conventional aspect of this development. The usual solids content of resins is used in the bath, this factor ranging from about 3 to about 25%, preferably from about 5 to about 15%. Bath pH can range considerably, but it is preferred to use a bath pH of from about pH 7.5 to about pH 10.5. The usual curing agents are aminoplast resins, but water dispersible phenolic resins are also useful, or N-methylol groups can be included in one or the other of the copolymers which are used herein to provide a self-cure in known fashion.

This invention is illustrated in the Examples which follow, all parts herein being by weight unless otherwise noted.

BEST MODE FOR CARRYING OUT THE INVENTION

EXAMPLE 1

(Preparation of Epoxy Ether Intermediate)

| Parts by Weight | Component |
| --- | --- |
| 1500 | Epoxy resin (see Note 1) |
| 500 | Methyl ethyl ketone |
| 810 | Oleyl alcohol (see Note 2) |

Charge the above into a reactor, set a reflux condenser, and heat to 90° C.

| | |
|---|---|
| 1.2 | Boron trifluoride etherate |
| 90 | Oleyl alcohol (see Note 2) |

Premix the catalyst and fatty alcohol and add the catalyst solution to the reactor over a 45 minute period. Set the Dean-Stark trap. Increase the temperature to 120° C. and hold for 2 hours. Distill of methyl ethyl ketone and collect it in the trap until 140° C. is reached and all the methyl ethyl ketone is distilled off. Start cooling and add 600 parts of 2-butoxy ethanol to provide a product containing 79.3% solids, having a Gardner-Holdt viscosity of $Z_6$-$Z_7$ and a Gardner color of 2.

Note 1

The epoxy resin is a diglycidyl ether of bisphenol A having an average molecular weight of 1000 and an epoxide equivalent weight of 500. The commercial product Epon 1001 (Shell) can be used.

Note 2

Commercial oleyl alcohol having an equivalent weight of 300, an iodine value of 75-85 and an hydroxyl value of 205-225 can be used as supplied by Ashland Oil, Inc. under the trade designation ADOL 32.

EXAMPLE 2

(Preparation of carboxyl-functional copolymer)

| Parts by Weight | Component |
|---|---|
| 250 | 2-butoxy ethanol |
| 425 | Epoxy ether of Example 1 |

Charge the above into a reactor, heat to 140° C. and set the reflux condenser.

| | |
|---|---|
| 550 | Styrene |
| 290 | Acrylic acid |
| 40 | Cumene hydroperoxide |

Add the above over a 3½ hour period while maintaining 140° C. When addition is completed hold for one hour.

| | |
|---|---|
| 6 | Cumene hydroperoxide - Add and hold one hour. |
| 6 | Cumene hydroperoxide - Add and hold one hour. |
| 6 | Cumene hydroperoxide - Add and hold one hour. |
| 5 | Diisopropanol amine - Add. |
| 10 | 2-butoxy ethanol - Add. |
| 550 | Olefin Epoxide 14-16 (see Note 3) |

Add over a 30 minute period. Hold for a constant acid value (40-43). Cool and add 420 parts of isopropanol and 250 parts 2-butoxy ethanol to provide a product having a solids content of 62.7%, a Gardner-Holdt viscosity of $Z_3$-$Z_4$, and a Gardner color of 3-4. The acid value, on solids, was 42.4.

Note 3

A mixture of $C_{14}$ and $C_{16}$ 1,2-monoepoxides. The total 1,2-monoepoxide content is 90.79%, 66.52% being $C_{14}$ monoepoxide and 24.27% being $C_{16}$ monoepoxide. The oxirane oxygen content is 6.8%, the iodine number is 2.2, and the acidity is 0.31% as acetic acid.

EXAMPLE 3

(Preparation of Acrylic Dispersion)

| Parts by weight | Component |
|---|---|
| 650 | Deionized water |
| 0.65 | Ammonium persulfate |

Charge to a reactor and heat to 90° C. Then prepare a monomer premix consisting of the following:

| | |
|---|---|
| 240 | Styrene |
| 50 | Polyhydric alcohol (see Note 4) |
| 30 | Acrylic Acid |
| 220 | Ethyl acrylate |

Then prepare a catalyst premix consisting of:

| | |
|---|---|
| 480 | Deionized water |
| 2.5 | Ammonium persulfate |

Add the monomer premix and the catalyst premix solution to the reactor, simultaneously, over a 2½ hour period at 90° C. When addition is complete, hold the temperature at 90° C. for 1½ hours. Cool to 30° C. and neutralize with the following solution:

| | |
|---|---|
| 60 | Dimethyl ethanol amine |
| 100 | Deionized water. |

The copolymer has an acid number of 38.1 and a resin solids content of 30.8%. This dispersion was diluted to 15% solids with deionized water and passed through an anionic ion exchange column to remove water solube salts (residue from the ammonium persulfate catalyst).

Note 4

Liquid trihydric polyoxypropylene derivative of trimethylol propane having an average molecular weight of 2540, an hydroxyl number (KOH/g.) of 63, and a viscosity of 25° C. of 440 centipoises.

EXAMPLE 4

(Preparation of Pigmented Electrocoat Coil Primer)

Part 1

Grind portion

| Parts | Component |
|---|---|
| 300 | Carboxyl-functional copolymer solution of Example 2 |
| 350 | Barium chromate pigment |
| 18 | Thickener (Polyacrylic acid neutralized with ammonia) |
| 241 | 2-butoxy ethanol |
| 16 | Dimethyl ethanolamine |

The above are mixed and then ground in a sandmill to a Hegman fineness of 7-8. This provides barium chromate particles wetted with a carboxyl-functional solution polymer which is partially neutralized with amine, ready to be dispersed in an aqueous medium.

Part 2
Letdown

| | |
|---|---|
| 5 | Grind portion from Part 1 |
| 1620 | Acrylic dispersion of Example 3 |
| 51 | Dimethyl ethanolamine |
| 179 | Benzoguanamine formaldehyde condensate |
| 195 | Carboxyl-functional copolymer solution of Example 2 |
| 800 | Deionized water |

This dispersion is then further let down to 7.5% solids by adding 6000 parts of deionized water to 2230 parts of the above Letdown. This provides a bath having a pH of about 9.3 and a conductivity of about 1200 micromhos.

Industrial Applicability

Aluminum panels, both merely cleaned and chromate pretreated, are electrocoated as the anode immersed in the electrocoating bath described above. Electrodeposition is carried out at about 50 volts and continued until the current flow is negligible. In this way the improvement described hereinbefore is obtained. As a practical matter, and although the corrosion resistance obtained with chromate pretreatment is better than when the chromate pretreatment is not used, the disadvantages of using the pretreatment are such that it is preferred to dispense with its use since the corrosion protection obtained herein is very acceptable.

The electrodeposition voltage is conventional and the electrocoated aluminum substrate is removed from the bath, usually rinsed with water, and then baked to cure the coating, baking times and temperatures being unchanged by the presence of the small proportion of pigment. Moreover, these small amounts of pigment do not unduly disturb the electrocoating operation as would be expected if larger amounts of corrosion resistant pigment were used because of the partial solubility of the pigment.

We claim:

1. An aqueous anodic electrodeposition bath having a resin solids content of from about 3 to about 25% and particularly adapted to electrodeposit substantially clear coatings possessing superior corrosion resistance on aluminum substrates comprising, water having dispersed therein a carboxyl-functional polymer at least partially neutralized with a volatile base and from 0.08 to 0.5 part, per 1000 parts of said bath, of finely divided particles of pigment grade.

2. An aqueous bath as recited in claim 1 in which said carboxyl-functional polymer is a mixture of: 1- a copolymer produced by the copolymerization of monoethylenic monomers including about 1 to about 30% of monoethylenic caboxylic acid dispersed in water while in solution in a polyhydric alcohol having a molecular weight of about 300 up to about 6000; and 2- a carboxyl-functional resin which dissolves in water with the aid of a base.

3. An aqueous bath as recited claim 2 in which said polyhydric alcohol is an aliphatic polyether derived from a trihydric or tetrahydric alcohol having a molecular weight in the range of 350 to 5000 and present in an amount up to about 50% of the monomers which are copolymerized.

4. An aqueous bath as recited in any of claims 1 or 2 in which said copolymer produced in dispersion has an acid value in the range of 12 to 80.

5. An aqueous bath as recited in claim 4 in which said carboxyl-functional resin which dissolves in water is a copolymer of monoethylenic monomers constituting 5-75% of the copolymer and including monoethylenic carboxylic acid, with a polyepoxide having a 1,2-epoxy equivalency of from 1.2 to about 2.0 etherified to remove epoxy functionality with oleyl alcohol.

6. An aqueous bath as recited in claim 5 in which the monomer components of said carboxylfunctional resin which dissolves in water consist of about 50% up to about 85% of styrene, vinyl toluene or a mixture thereof and at least 15% of said monoethylenic carboxylic acid.

7. An aqueous bath as recited in any of claims 1, 2, 5 or 6 in which said pigment is dispersed in the polymer which dissolves in water in an amount of 0.1 to 5 parts of pigment per part of soluble polymer.

8. An aqueous bath as recited in claim 7 in which the ratio of dispersion resin to water soluble polymer is from 0.10:1 to 1.0:1.

9. An aqueous bath as recited in any of claims 1 or 2 in which said pigment is selected from the group consisting of barium chromate, strontium chromate, strontium phospho silicate, potassium aluminum silicate and silica.

* * * * *